United States Patent [19]

Tourres

[11] 4,170,417
[45] Oct. 9, 1979

[54] APPARATUS AND METHOD FOR OPTICAL CONTROL OF THE PROFILE OF A BODY UTILIZING A PLANAR LASER BEAM

[75] Inventor: François G. Tourres, Octeville-sur-Mer, France

[73] Assignee: International Glass Equipment Co. S.A.R.L., Le Havre, France

[21] Appl. No.: 781,419

[22] Filed: Mar. 25, 1977

[30] Foreign Application Priority Data

Apr. 2, 1976 [FR] France ................... 76 09768

[51] Int. Cl.$^2$ ............................................. G01B 11/10
[52] U.S. Cl. ................... 356/385; 250/223 B
[58] Field of Search .............. 356/158, 160, 167; 250/223 R, 223 B, 224, 560

[56] References Cited

U.S. PATENT DOCUMENTS

| | | | |
|---|---|---|---|
| 2,283,036 | 5/1942 | Bohn | 250/224 |
| 3,235,739 | 2/1966 | Rottmann | 250/223 R |
| 3,529,169 | 9/1970 | Heaney et al. | 250/223 B |
| 3,566,135 | 2/1971 | Mouchart | 250/560 |
| 3,716,136 | 2/1973 | Birner et al. | 250/223 B |
| 3,956,629 | 5/1976 | Gomm et al. | 250/223 R |
| 3,997,270 | 12/1976 | Suzuki | 356/167 |
| 4,007,992 | 2/1977 | Petrohilos | 356/160 |

FOREIGN PATENT DOCUMENTS

| | | | |
|---|---|---|---|
| 2019290 | 11/1971 | Fed. Rep. of Germany | 356/167 |
| 791813 | 3/1958 | United Kingdom | 356/167 |

*Primary Examiner*—John K. Corbin
*Assistant Examiner*—Wm. H. Punter
*Attorney, Agent, or Firm*—Cushman, Darby & Cushman

[57] ABSTRACT

A device for measuring the profile of a body wherein three expanded planar laser beams are provided, each of the planar beams being relatively disposed at angles of 45° and directed towards the path of a moving body. Respective photocells are arranged to be illuminated by the beams after passage across the path of the moving body. Relative movement is effected between the body and the laser beams, such that the body successively passes through the beams and effectively masks respective ones of the beams from their associated photocells for a time period indicative of the diameter of the body at the photodetector height. The photodetector thus provides an electrical signal representative of such period. The diameter of the body is measured at a plurality of heights to provide a profile of the body in a vertical plane perpendicular to the plane of the light beam.

11 Claims, 3 Drawing Figures

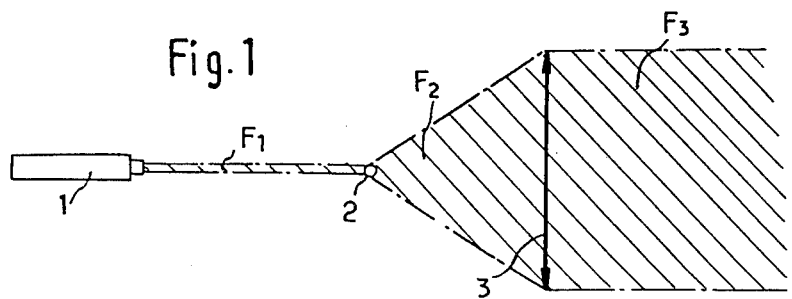
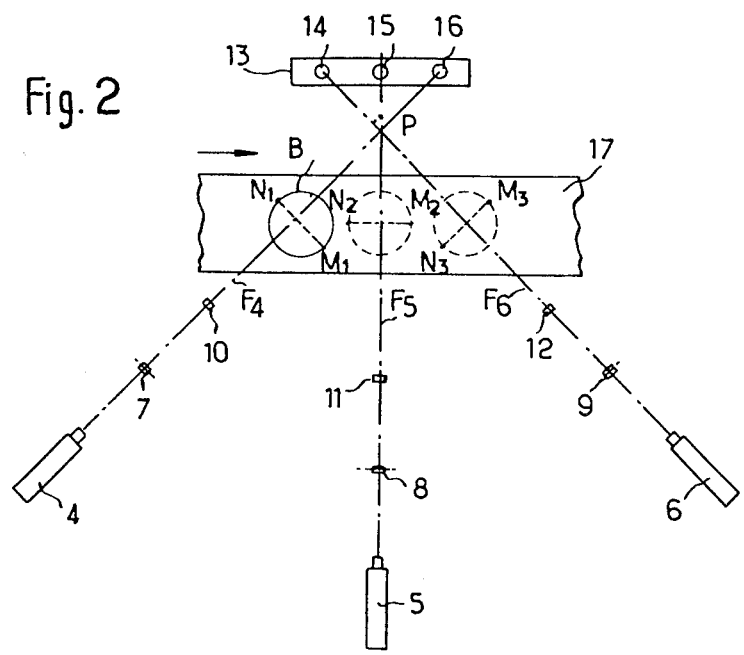
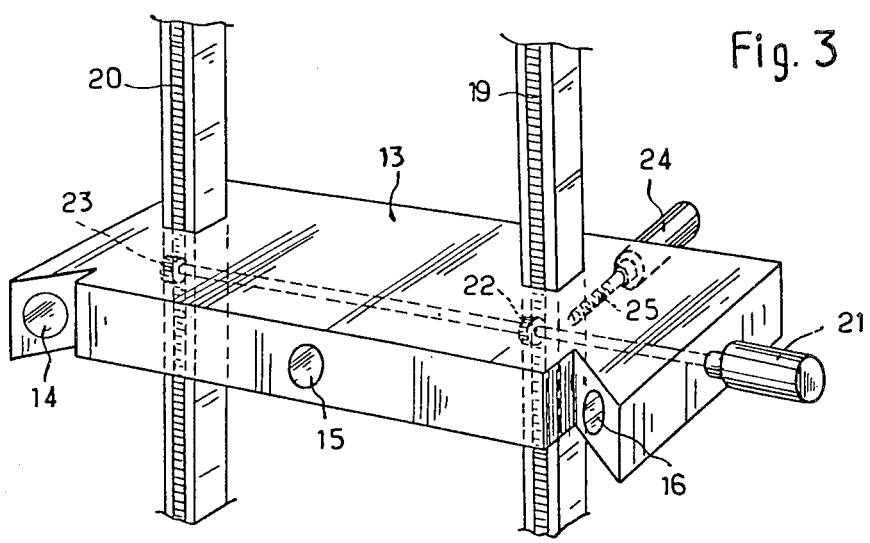

APPARATUS AND METHOD FOR OPTICAL CONTROL OF THE PROFILE OF A BODY UTILIZING A PLANAR LASER BEAM

The present invention relates to optical measurement of the profile of an object and, particularly, to the measurement of the shape and dimensions of glass bottles.

Optical measurement of one or more dimensions of an object is well known in the art. For descriptions of various systems effecting such optical measurements, reference is made to U.S. Pat. Nos. 3,716,136 issued Feb. 13, 1973 to R. Birner et al, 3,708,065 issued Jan. 2, 1973 to L. Aull et al and 3,089,594 to R. Early, French patent applications Nos. 2,028,465 (EMHART Corporation) and 2,218,550 (E. I. DuPont DeNemours & Company) and German OS 2,019,290 (Joerg K.G.).

A system utilizing a plurality of laser beams relatively disposed in a vertical plane is described in French Pat. No. 2,314,474 filed by the present inventor on June 11, 1975. A relative motion in a horizontal direction is effected between the beams and the object, such that the object passes through the beam and effectively masks photoelectric detectors disposed to receive the beams. The photoelectric detectors enable pulse counters during the period they are shut off from the beam by the object. The pulses are generated in accordance with the relative motion of the object and light beam, for example, by a coding wheel the rotation of which is related to the motion of a conveyor belt, such that the time period during which the photocell is masked by the object provides a determination of the object diameter at the photocell height. A similar arrangement downstream is provided at another angle for measuring a further profile at an angle (preferably 90°) with respect to the profile measured during the first pass.

Such a system is disadvantageous, however, in that the levels of the respective laser beams and corresponding photodetectors are invariable. Thus, the profile is reconstituted from a limited number of sampling diameters which are always located at the same levels, whatever the object's shape.

Therefore, it is an object of the instant invention to avoid this drawback by effecting the measurement by means of one or more vertically disposed planar light beams, obtained from a laser cooperating with an optical system and photoelectric detectors which are vertically movable within the plane of the beam. In a preferred embodiment, the optical systems include a cylindrical lens disposed at the focus of a converging thin lens, the cylindrical lens having an axis at right angles with the laser beam.

According to another feature of the invention, the device includes three vertical planar laser beams intersecting at a vertical segment and cooperating with a single array of detectors.

These and other features and advantages of the invention will become more clearly apparent from the following description in conjunction with the appended drawings wherein like numerals denote like elements:

FIG. 1 shows means for generating a planar laser beam;

FIG. 2 is a diagrammatic view of a profile control device utilizing three planar laser beams; and FIG. 3 is a perspective view of a movable mechanical supporting unit for the three detectors.

Referring now to FIG. 1, there is shown a laser 1 generating a cylindrical beam F1 which is directed to illuminate a cylindrical lens 2. Lens 2 has a diameter which is slightly larger than that of beam F1 and a cylindrical length substantially equal to the beam diameter. Lens 2 is located at the focus of a thin converging lens 3 having a width substantially equal to the length of cylindrical lens 2. Lens 2 in effect, provides an expanded beam F2 which illuminates lens 3, which in turn effectively converts the beam F2 into a planar parallel beam F3. The width of lens 3 is small with respect to its height such that beam F3 is equivalent to a planar beam. For a more detailed description of a suitable optical system for providing a planar light beam, reference is made to the aforementioned U.S. Pat. No. 3,708,065 to L. Aull et al.

Referring now to FIG. 2, there is shown in plan view, three planar laser beam generating means of the type just disclosed, including respective lasers 4, 5 and 6 of the continuous emission type, cylindrical lenses 7, 8 and 9 and thin lenses 10, 11 and 12. Lasers 4, 5 and 6 and lenses 7–12 operate to produce respective planar beams F4 F5 and F6. Planar beams F4, F5 and F6 are vertically disposed and intersect at a vertical segment P. Beams F4 and F6 are disposed at 45° with respect to beam F5. A horizontal movable support member 13 is arranged at a right angle with beam F5 and supports three conventional photodetector cells 14, 15 and 16, which are arranged to be illuminated by beams F6, F5 and F4, respectively.

Horizontal conveying belt 17, driven at a predetermined constant speed in the direction indicated by an arrow, is disposed between lasers 4–6 and cells 14, 15 and 16. An object such as, for example, a bottle B, is placed on belt 17 and is moved at the predetermined speed through beams F4, F5 and F6 in succession, shutting out the beams from the associated cells 14–16. The time periods during which bottle B blocks or shuts out light beams F4, F5 and F6 from cells 16, 15 and 14 are respectively proportional to the diameters $M_1N_1$, $M_2N_2$ and $M_3N_3$ of the cross-sections of the bottle in the horizontal plane containing the cells. The shut out periods are measured by counting of periodic pulses having a frequency proportional to a predetermined driving speed. For a description of suitable period measuring means, reference is made to the above-mentioned French patent application No. 75.18201 by the present inventor.

As will be hereinafter more fully explained, the support member 13 is adapted to dispose cells 14, 15 and 16 at any height within the planes of beams F4, F5 and F6. By measuring the diameter of bottle B at a plurality of predetermined levels, a plot of the profile of bottle B in a vertical plane perpendicular to the plane of the light beam can be made. Thus, three complete profiles of the bottle may be plotted with as many sampling points as desired. A specific program wherein cells 14–16 are successively set at a plurality of predetermined heights in accordance with the shape of the particular type of bottle, to be measured can thus be utilized.

It should be appreciated that measuring apparatus in accordance with the present invention is particularly advantageous for detecting defects, i.e., deviations from a predetermined profile, in a body such as a glass bottle during a manufacturing process. In some instances, a bottle may suffer from a deformation by collapse, such deformation maintaining a constant peripheral length all along the height of the cylindrical part of the bottle's body. The plotting of two profiles in vertical planes at right angles with one another (such as the planes containing beams F4 and F6) will not always detect such a deformation. Accordingly, in accordance with one aspect of the present invention, a third profile is plotted in the intermediate plane of beam F5. Such a plot will provide a contour substantially departing from the normal rectangular shape. More generally, the plotting of two mutually perpendicular profiles and of a third intermediate profile practically makes sure that no defect will be undetected.

In FIG. 3, there is shown a mechanism for adjusting the cells 14–16 to various predetermined heights within the respective planes of beams F4, F5 and F6. A support member 13, having mounted thereon photodetectors 14–16 is adapted to slide on two vertically disposed slide bars 19 and 20. Detector 15 is centrally located having an optical axis directed perpendicular to the front face of member 13, while detectors 14 and 16 are mounted having respective optical axis disposed at 45° with respect to the front face. An adjustable knob 21 controls rotation of two pinions 22, 23 which mesh with racks 24, 25 respectively secured to slide bars 19 and 20. The common axle of pinions 22, 23 and the axle of knob 21 are mounted in member 13. Another adjustable control knob 26 controls the clamping screw 27, the end of which provides locking of the position of member 13 on the slide bar. It should be appreciated that the pinions 22, 23 and clamp 26–27 can be controlled to adjust member 13 sequentially to a plurality of predetermined heights in accordance with a preset program by, for example, a computer controlled automatic mechanism.

It should be appreciated that a plurality of support members, each fitted with three detectors could be provided on the slide bars, in order to restrict the displacement of each support member necessary to support them at a desired level, and to provide concurrent measurement of the diameter of the bottle in the vertical plane at a plurality of heights.

It will be understood that the above description is of illustrative embodiments of the present invention and that the invention is not limited to the specific forms shown. Modifications may be made in the design and arrangements of the elements without departing from the spirit of the invention, as will be apparent to those skilled in the art.

What is claimed:

1. An apparatus for optically measuring the dimensions of plural sections at each of a plurality of vertically displaced areas of an object said apparatus comprising:
    means for emitting plural vertically disposed respectively intersecting planar beams of parallel light rays;
    means for effecting relative movement between said object and said planar beams in a horizontal direction thereby causing the beams to be intercepted by the object;
    a plurality of photo-electric detectors, each being placed in the plane of a respectively corresponding one of said beams and adapted to receive only that portion of its associated planar beam which is substantially contained in a predetermined horizontal plane;
    means for determining the time elapsed between the beginning and end of interception of said beam by said object;
    said light emitting means including a laser associated with an optical system for transforming a cylindrical light beam output from the laser into a vertical planar light beam; and
    means for moving said photoelectric detectors vertically along the height of said object to obtain a reading of its profile.

2. The apparatus of claim 1 wherein said light emitting means comprises three lasers associated with three optical systems to form respectively three vertical planar beams intersecting at a vertical segment and each associated with at least a photoelectric detector adjustable in height in the plane of the corresponding beam, and said means for effecting relative movement comprises means for moving said object in a horizontal plane so that it intercepts each of said three beams in succession.

3. The apparatus of claim 2 wherein two of said planar beams are orthogonal and the third forms a 45° angle with each of the other two.

4. The apparatus of claim 2 wherein said means for moving said photodetector comprises:
    a mounting structure on which said photodetectors are mounted, said structure being mounted to slide on two vertical slides and whose position in height is adjustable by means of a pinion working with a rack.

5. The apparatus of claim 1 wherein said means for moving said photodetector comprises:
    a mounting structure on which said photodetectors are mounted, said support structure being mounted to slide on two vertical slides and whose position in height is adjustable by means of a pinion working with a rack.

6. An apparatus for optically measuring the dimensions of plural sections at each of plurality of vertically displaced areas of a body so as to determine the profiles of said body from a number of different views, said apparatus comprising:
    means for generating plural intersecting planar coherent light beams of parallel rays;
    means for effecting relative motion between said body and said planar light beams, such that said body passes through said planar light beams at a predetermined constant speed;
    plural photodetector means each respectively responsive to the presence of a corresponding one of said planar light beams and adjustably disposed in the plane of its associated planar light beam, for generating signals indicative of the beginning and end of the elapsed time period during which said object is illuminated by its respectively associated one of said planar light beams, said period being indicative of the transverse horizontal dimension of said body in the plane of said photodetector means; and
    means for disposing each of said photodetector means at a plurality of vertical heights within the plane of its respectively associated planar light beam, whereby the vertical profile of said object in a plane perpendicular to each of said light beam planes is provided.

7. The apparatus of claim 6 wherein said means for generating plural planar light beams comprises:
    a laser source for generating a cylindrical light beam and an optical system operative on said cylindrical light beam for generating therefrom said planar beam.

8. The apparatus of claim 6 including means for generating at least three of said planar light beams, two of said three planar beams being orthogonally disposed with respect to each other and the third being intermediately disposed, at 45° with respect to each of said two planar beams.

9. A method for optically measuring the dimensions of plural sections at each of a plurality of vertically displaced areas of a body so as to determine the profiles of said body from a number of different views, said method comprising the steps of:

generating plural intersecting planar coherent light beams of parallel rays;

adjustably disposing a photodetector in the path of each of said planar light beams;

passing said object through said light beams at a predetermined constant speed such that it masks said photodetectors, whereby the elapsed time period said object masks each of said photodetectors is indicative of the transverse horizontal dimension of said object in the plane of said photodetector;

generating in said photodetector signals indicative of the beginning and end of said masking elapsed time period; and sequentially disposing said photodetectors at a plurality of heights in the plane of said light beams to generate an indication of said profiles.

10. The method of claim 9 further including the step of detecting deviations in said indicated profiles from predetermined profiles.

11. The method of claim 10 further including the steps of:

disposing a first planar light beam in a predetermined direction;

disposing a second planar light beam in a direction orthogonal to said predetermined direction; and disposing a third planar light beam in a direction 45° with respect to said predetermined direction and said orthogonal direction;

said directions being such that said object sequentially passes through said first, third and second light beams.

* * * * *